US012680541B2

(12) United States Patent
Clark et al.

(10) Patent No.: US 12,680,541 B2
(45) Date of Patent: Jul. 14, 2026

(54) FLOW METER FOR DOSING PUMPS

(71) Applicant: Advantage Controls, LLC, Muskogee, OK (US)

(72) Inventors: Christopher Henry Clark, Normangee, TX (US); Bruce Dorman Heller, Mazie, OK (US)

(73) Assignee: Advantage Controls, LLC, Muskogee, OK (US)

( * ) Notice: Subject to any disclaimer, the term of this patent is extended or adjusted under 35 U.S.C. 154(b) by 31 days.

(21) Appl. No.: 18/915,008

(22) Filed: Oct. 14, 2024

(65) Prior Publication Data

US 2026/0104044 A1        Apr. 16, 2026

(51) Int. Cl.
  F04B 49/06        (2006.01)
  F04B 13/00        (2006.01)
        (Continued)

(52) U.S. Cl.
  CPC .............. F04B 49/06 (2013.01); F04B 13/00 (2013.01); F04B 19/006 (2013.01); F04B 49/065 (2013.01); F04B 49/08 (2013.01); F04B 49/20 (2013.01); F04B 51/00 (2013.01); G01F 1/22 (2013.01); G01F 1/24 (2013.01); G01F 1/26 (2013.01); G01F 1/28 (2013.01); G01F 1/383 (2013.01); G01F 1/58 (2013.01);
        (Continued)

(58) Field of Classification Search
  CPC ..... G01F 1/24; G01F 1/22; G01F 1/28; G01F 1/58; G01F 1/26; G01F 1/582; G01F 1/383; G01F 1/588; G01F 1/66; G01F 1/72; G01F 9/023; F04B 49/065; F04B 49/06; F04B 2205/09; F04B 49/20; F04B 13/00; F04B 51/00; F04B 19/006; F04B 2203/0402; F04B 49/08
  See application file for complete search history.

(56) References Cited

U.S. PATENT DOCUMENTS 3,931,737 A * 1/1976 Conkling .................. G01F 1/24
                                                    340/870.35
4,523,480 A     6/1985 Inoue
                    (Continued)

FOREIGN PATENT DOCUMENTS

CN        202645538 U        1/2013
DE          1648098 A1        5/1971
                    (Continued)

*Primary Examiner* — Peter J Bertheaud
(74) *Attorney, Agent, or Firm* — Larry K. Roberts

(57)        ABSTRACT

A flow meter for a pulsed fluid stream, includes a flow body having an inlet and an outlet and defining a channel for the flow of the fluid stream in a direction from the inlet to the outlet. A float structure is disposed in the channel, having a ferromagnetic body. First, second and third coils surrounding first, second and third separated portions of the float body. The second coil is configured as a drive coil for connection to an AC signal generator and situated between the first and third coils along the float body. The first and third coils generate induced voltage signals in response to the position of the float in the channel. An electronics module is connected to the first, second and third coils, including the AC signal generator and an electronic circuit for measuring the position of the float structure in the channel.

16 Claims, 8 Drawing Sheets

(51) Int. Cl.

| | |
|---|---|
| *F04B 19/00* | (2006.01) |
| *F04B 49/08* | (2006.01) |
| *F04B 49/20* | (2006.01) |
| *F04B 51/00* | (2006.01) |
| *G01F 1/22* | (2006.01) |
| *G01F 1/24* | (2006.01) |
| *G01F 1/26* | (2006.01) |
| *G01F 1/28* | (2006.01) |
| *G01F 1/38* | (2006.01) |
| *G01F 1/58* | (2006.01) |
| *G01F 1/66* | (2022.01) |
| *G01F 1/72* | (2006.01) |
| *G01F 9/02* | (2006.01) |

(52) U.S. Cl.
CPC .............. *G01F 1/582* (2013.01); *G01F 1/588* (2013.01); *G01F 1/66* (2013.01); *G01F 1/72* (2013.01); *G01F 9/023* (2013.01); *F04B 2203/0402* (2013.01); *F04B 2205/09* (2013.01)

(56) References Cited

U.S. PATENT DOCUMENTS

| | | | |
|---|---|---|---|
| 5,214,964 A | 6/1993 | Hartfiel | |
| 6,339,959 B1 * | 1/2002 | Natapov | G01F 1/28 |
| | | | 73/239 |
| 6,889,563 B2 | 5/2005 | Tomita et al. | |
| 7,360,454 B2 | 4/2008 | Kawashima et al. | |

FOREIGN PATENT DOCUMENTS

| | | |
|---|---|---|
| DE | 3341661 A1 | 8/1984 |
| EP | 1621855 A1 | 2/2006 |
| GB | 630942 A | 10/1949 |

* cited by examiner

84'

84'-B1

FLOW METER FOR DOSING PUMPS

BACKGROUND OF THE INVENTION

Dosing pumps are used to inject chemicals or other substances into a stream of liquid or gas. One type of dosing pump, a solenoid-driven diaphragm pump, operates to inject the chemical in a pulsed operation. With pulsing dosing pumps there is currently not an affordable (under $1k) reliable closed loop solution for verifying the dosed chemical amount. Due to the pulsating of the dosing pump, many flow meters such as paddlewheel or turbine flow meters will not work well for flow measurements. The paddlewheel and turbine flow meters typically use optical pickups or magnetic pickups. Optical pickups tend to get obstructed over time as well as the blades become clogged. Magnetic pickup blades tend to get clogged and give false triggers due to pulse or some back flow.

Measuring flow rate in fractions of milliliters per stroke adds to the challenge to measure with available flow meters. A typical diaphragm dosing pump is driven by a magnetic solenoid shaft. As the diaphragm flexes outwardly, the fluid is moved through check valves. The diaphragm is typically a semi-flexible material and is influenced by back pressures and stroke lengths. The shorter the stroke length the higher the pressure the pump can operate. The shorter the stroke length the lower the fluid amount is pushed through the check valve and into the process. Therefore, both stroke length and pressure will cause fluctuation of output.

Another challenge to measuring accurate flow is that the output flow rate for diaphragm dosing pumps changes with process pressure. When the pressure changes, so does the output accuracy. The flow rate also changes due to diaphragm wear, stroke length stop movement and pump wear.

A flow meter and metering method in accordance with aspects of the invention is configured to return the actual output for each stroke with these variables in play.

DETAILED DESCRIPTION OF THE INVENTION

Figure 1:
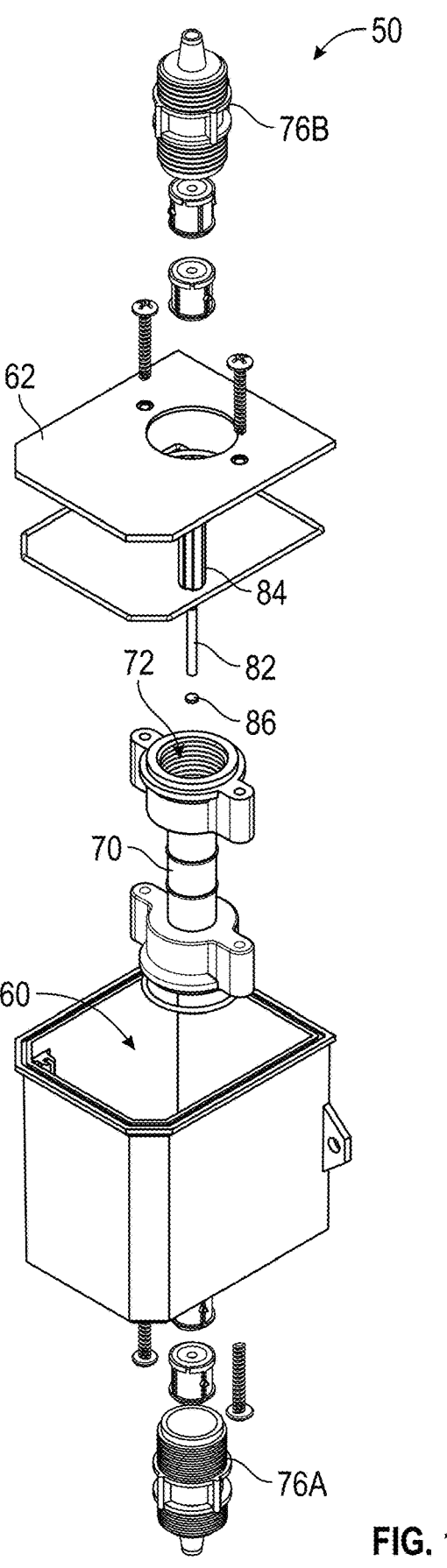
FIG. 1 is an exploded view of structural aspects of an exemplary embodiment of a flow sensor in accordance with aspects of the invention.

In the following detailed description and in the several figures of the drawing, like elements are identified with like reference numerals. The figures may not be to scale, and relative feature sizes may be exaggerated for illustrative purposes.

FIG. 1 is an exploded view of structural aspects of an exemplary embodiment of a flow sensor 50 in accordance with aspects of the invention. The sensor 50 includes a main housing 60 into which is fitted a sensor body 70 with an inner tubular opening 72 defining a float channel. A float structure includes a ferromagnetic rod 82 fitted within sheath 84. In an exemplary embodiment, the ferromagnetic rod is a ferrite pressed (sintered) material, although other ferromagnetic materials can be used, such as iron. The float structure is disposed within the tubular opening 72. A lid 62 is secured to the top of the main housing 60. In this exemplary embodiment, the sensor body with the flow sensor is mounted vertically so that gravity biases the float structure to a rest position.

For diaphragm dosing pumps which deliver fluid in a series of pulses, the stroke on-time is typically a set time in milliseconds (ms) on the solenoid. Different manufactures use different stroke on-times, usually from 45 ms to 120 ms depending on stroke speed and diaphragm size. The distance the diaphragm moves over the stroke on-time represents the velocity the fluid material moves within the area of the flow sensor channel. This has a repeatable linear correspondence to flow per stroke. In an exemplary embodiment, the electronics module of the flow meter grabs the flow sensor outputs and holds the peak value long enough to read into an analog-to-digital converter (ADC) of the microcomputer of the electronics module for digitization. Then the microcomputer resets this value waiting for the next sample.

Figure 2A:
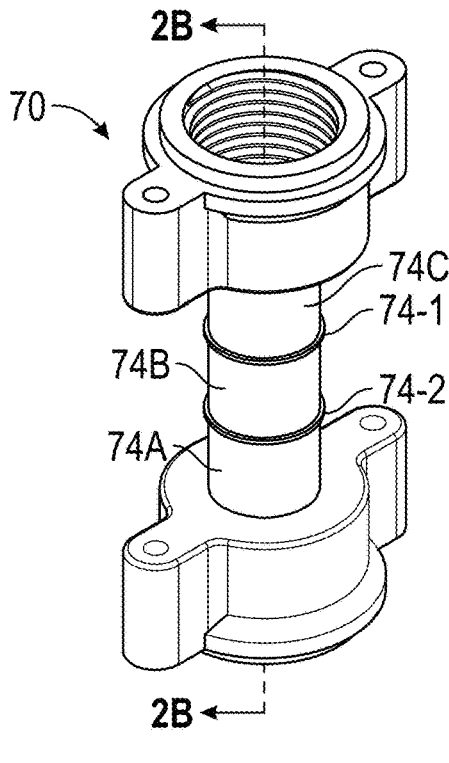
FIGS. 2A and 2B illustrate an exemplary embodiment of a sensor body of the flow sensor of FIG. 1.
Figure 2B:
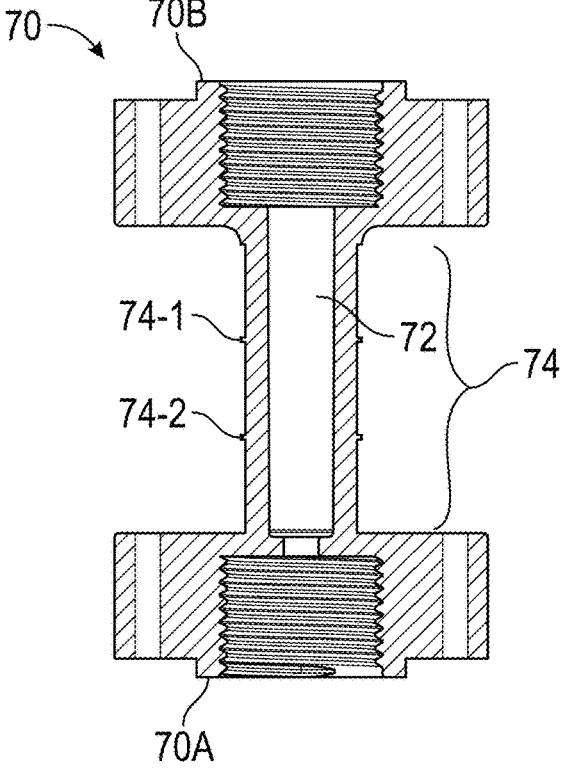

FIGS. 2A and 2B illustrate the sensor body 70 in further detail. The opening 72 communicates with threaded openings in both ends 70A and 70B, which allow the sensor body to be attached to check valves 76A and 76B (FIG. 1). Check valve 76A provides an input to the sensor 50 and check valve 76B an output from the sensor.

The exterior of the sensor body 70 includes a sensor windings region 74, which includes a bottom winding portion 74A, a center winding portion 74B and an upper winding portion 74C. The adjacent winding portions are separated by peripheral protrusions 74-1 and 74-2, respectively.

Figure 3:
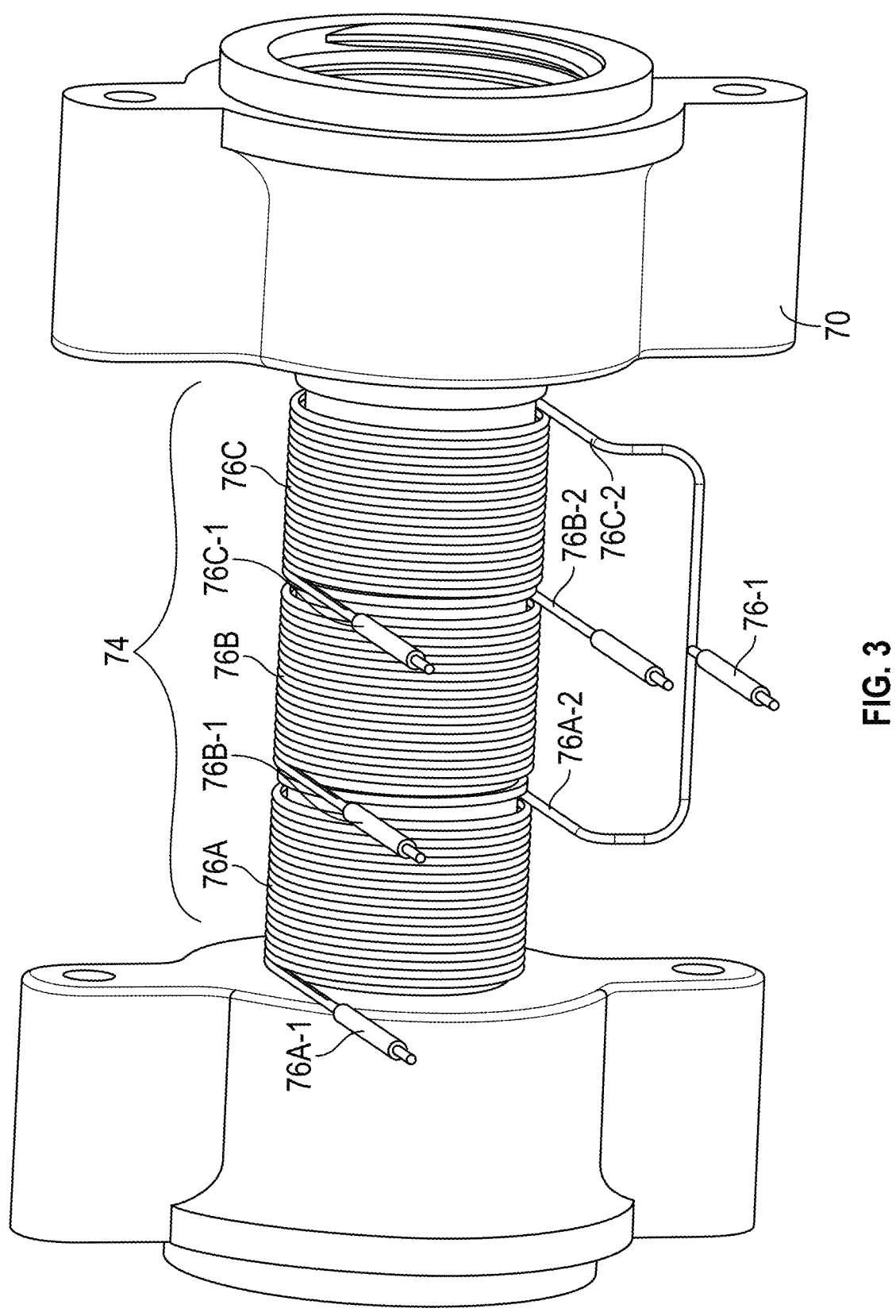
FIG. 3 illustrates an exemplary embodiment of the coils wound about a portion of the sensor body.

Referring to FIG. 3, the sensor 50 includes first, second and third coils 76A, ,76B and 76C. The first coil 76A is formed by winding a first wire about the bottom winding portion 74A, and having winding terminals 76A-1 and 76A-2. The second coil 76B is formed by winding a second wire about the center winding portion 74B, and having winding terminals 76B-1 and 76B-2. The third coil 76C is formed by winding a third wire about the upper winding portion 74C and having terminals 76C-1 and 76C-2. In this exemplary embodiment, terminals 76A-2 and 76C-2 are jumpered together to provide a common terminal 76-1.

In an exemplary embodiment, the wires forming each of the coils 76A, 76B and 76C are 40 AWG gauge wires, with 200 or greater turns on each winding portion to form the coil. The wires are insulated with polyester enameled insulation material or other higher temperature rated coatings. Of course, other embodiments may employ different wires, insulation and number of turns.

In an exemplary embodiment, each winding portion has a length of 0.5 inches, and the windings region 74 has a diameter of 0.690 inch. In this embodiment, the channel 72 has a diameter of 0.344 inch.

Figure 4A:
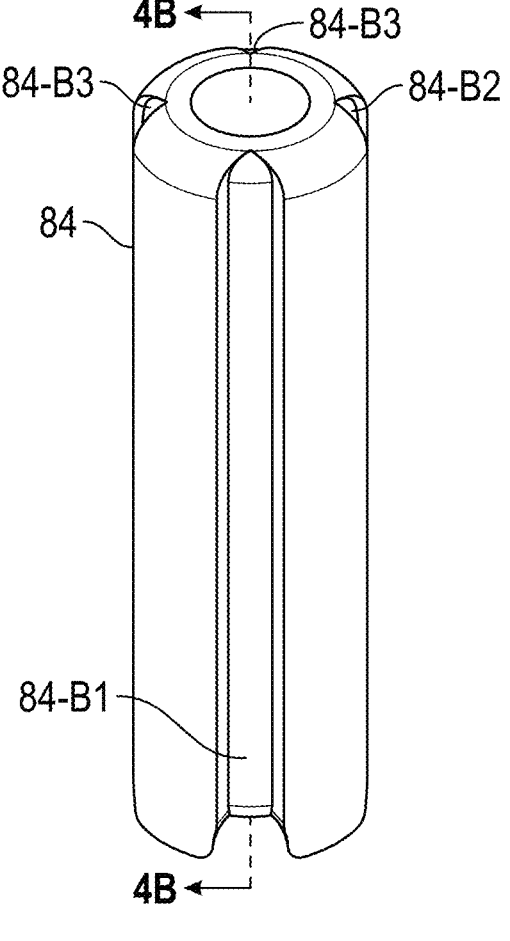
FIGS. 4A and 4B illustrate an exemplary embodiment of a float sheath of the float structure of the flow sensor.
Figure 4B:
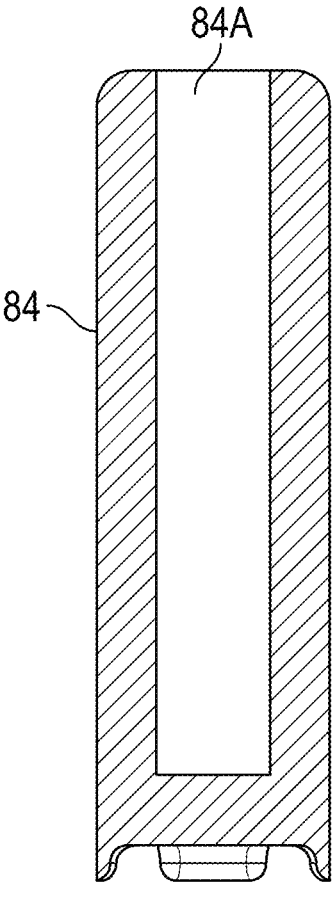

FIGS. 4A and 4B illustrate the float sheath 84 in further detail. The sheath is a generally cylindrical hollow structure, defining an interior opening 84A. The opening is sized to receive the ferrite rod 82. The sheath 84 is formed with a plurality of exterior channels; in this exemplary embodiment there are four channels 84B1-84B4 arranged at 90 degree spacing around the periphery of the sheath 84. In this exemplary embodiment, the sheath has an exterior diameter of 0.330 inch, a length of 1.15 inch and an interior opening diameter of 0.161 inch. The channels are formed with a depth of 0.02 inch. The particular dimensions are merely exemplary; other embodiments may have different dimensions. For example, the channel depth dimension may be different for fluids of significantly higher viscosity than water.

Figure 4C:
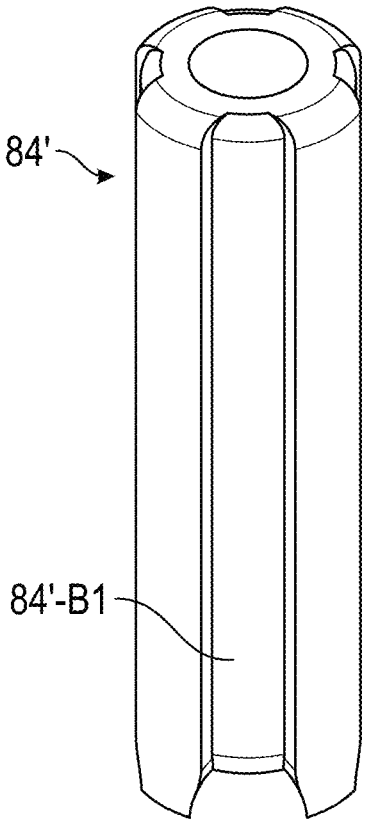
FIG. 4C illustrates an alternate embodiment of a float sheath.

The channels 84B1-84B4 are employed to determine the height of the float movement during dosing strokes. Lower flow rates (13 ml to 40 ml per minutes at 200 strokes per minute) will have better resolution with a smaller channel than the (40 ml to 118 ml per minute at 200 strokes per minute) higher flow rate. FIGS. 4A and 4B illustrate a sheath configuration with smaller channels. FIG. 4C illustrates a sheath 84' with larger channels 84'-B1 for the higher flow rate applications. In the exemplary embodiments, the larger channels have a width dimension larger than the width dimension of the smaller channels.

In an exemplary embodiment the sheath 84 is formed of a plastic material such as a PVDF.

The ferrite rod 82 in an exemplary embodiment has an outer diameter of 3 mm, and is a commercially available ferrite rod, such as from Fair-Rite Products Corp. Other ferrite rods may also function, as well as iron rods. In an exemplary embodiment, rod 82 is fitted into the opening 84A, and the ends sealed with ceramic potting 86 (FIG. 1).

Figure 5:
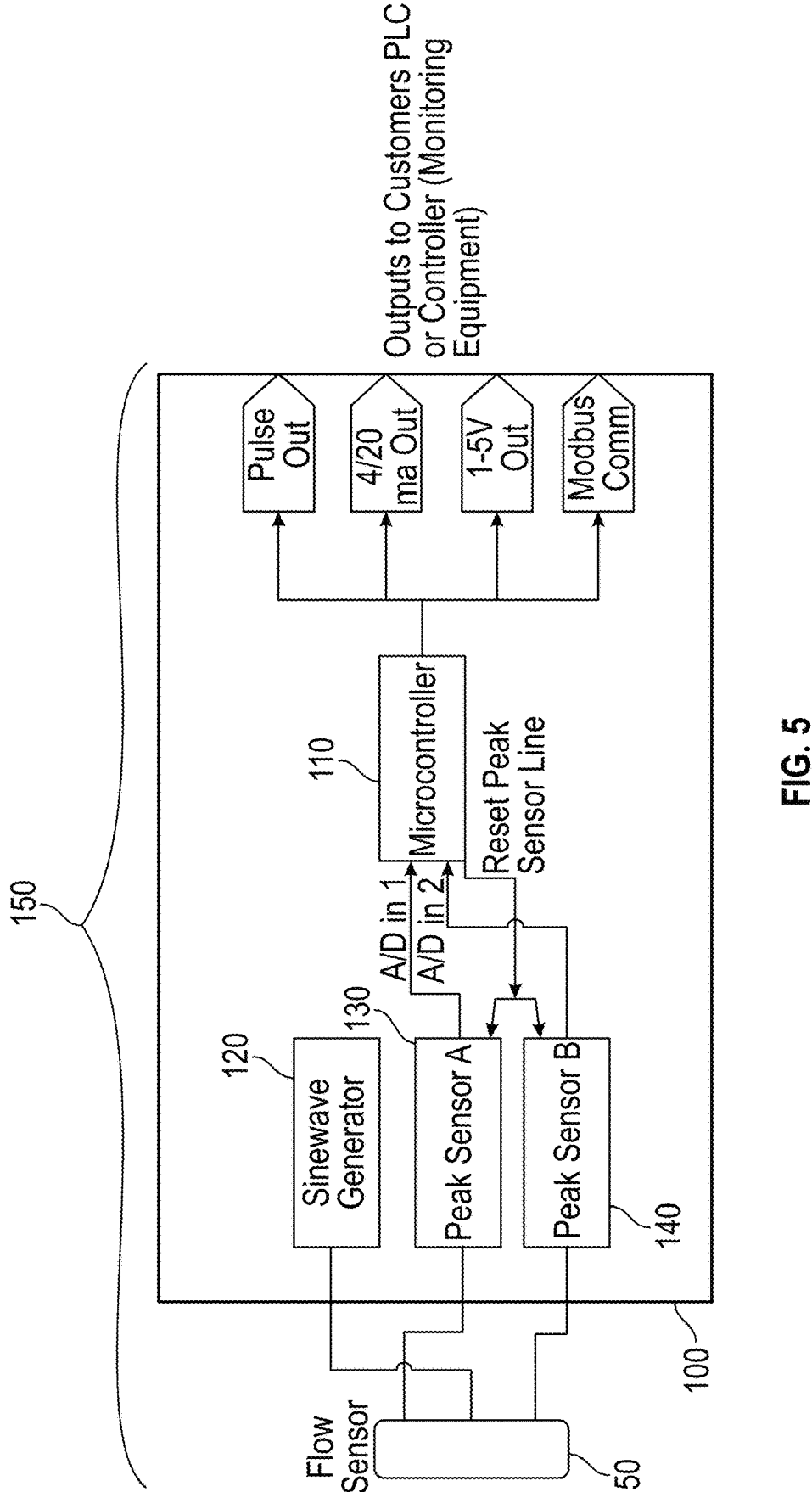
FIG. 5 is a schematic block diagram of an exemplary embodiment of a flow meter including the flow sensor of FIG. 1 and an electronics module electrically connected to the flow sensor.

FIG. 5 is a schematic block diagram of a flow meter 150 including the flow sensor 50 and an electronics module 100 electrically connected to the flow sensor. In this exemplary embodiment, the module 100 includes a microcontroller 110, a sinewave generator 120 connected to the second coil 76B and peak sensors A and B, 130, 140, connected to the first and third coils respectively. The output of the sinewave generator 120 drives the flow sensor center coil 76B, and is connected to terminals 76B-1 and 76B-2. In this embodiment, the microcontroller generates a pulse-width-modulated (PWM) square wave signal, which is filtered to a sine wave in a conditioning circuit (not shown), in this embodiment with a frequency of about 12 Khz. The sinewave generator 120 is an AC (voltage) signal generator, and may be implemented in other ways.

The flow sensor 80 when driven by the AC generator 120 acts as a transformer, wherein the changing magnetic field generated by the center coil 76B induces a voltage in the respective first and third coils 76A and 76C, the induced voltage in the respective first and third coils dependent on the position of the rod 82 within the channel.

In this exemplary embodiment, the peak sensor A (130) is connected to terminals 76A-1 of the first coil and the common terminal 76-1, and the peak sensor B (140) is connected to terminal 76C-1 of the third coil and the common terminal 76-1.

The peak sensor A 130 receives the sinewave output of coil 76A, which voltage amplitude correlates to the position of the float.

The peak sensor B 140 produces a sinewave output, whose voltage amplitude correlates to the position of the float.

The microcontroller 110 is programmed to monitor the sensor 130 and 140 peak values within a sample time; e.g., the voltage levels may be read by the microcontroller once every millisecond. The microcontroller resets the peak hold circuits 130, 140 after each sample. The microcontroller program stores the voltage levels and compares each sample to the previous sample. When the microcontroller program determines that the voltage samples for the circuit 140 are declining and not increasing, the microcontroller indicates the stroke end. In an exemplary embodiment, the microcontroller may look for several successive declining voltage samples, say three, before declaring the stroke end. Timing between the declining detections from one pulse to another allows the calculation of the stroke rate from the flow sensor.

The microcontroller 110 may be configured to create any required flow meter output signal to a hardware interface needed for the customer, such as Pulse Out, 4/20 ma, 1-5V, Modbus etc.

Figure 6:
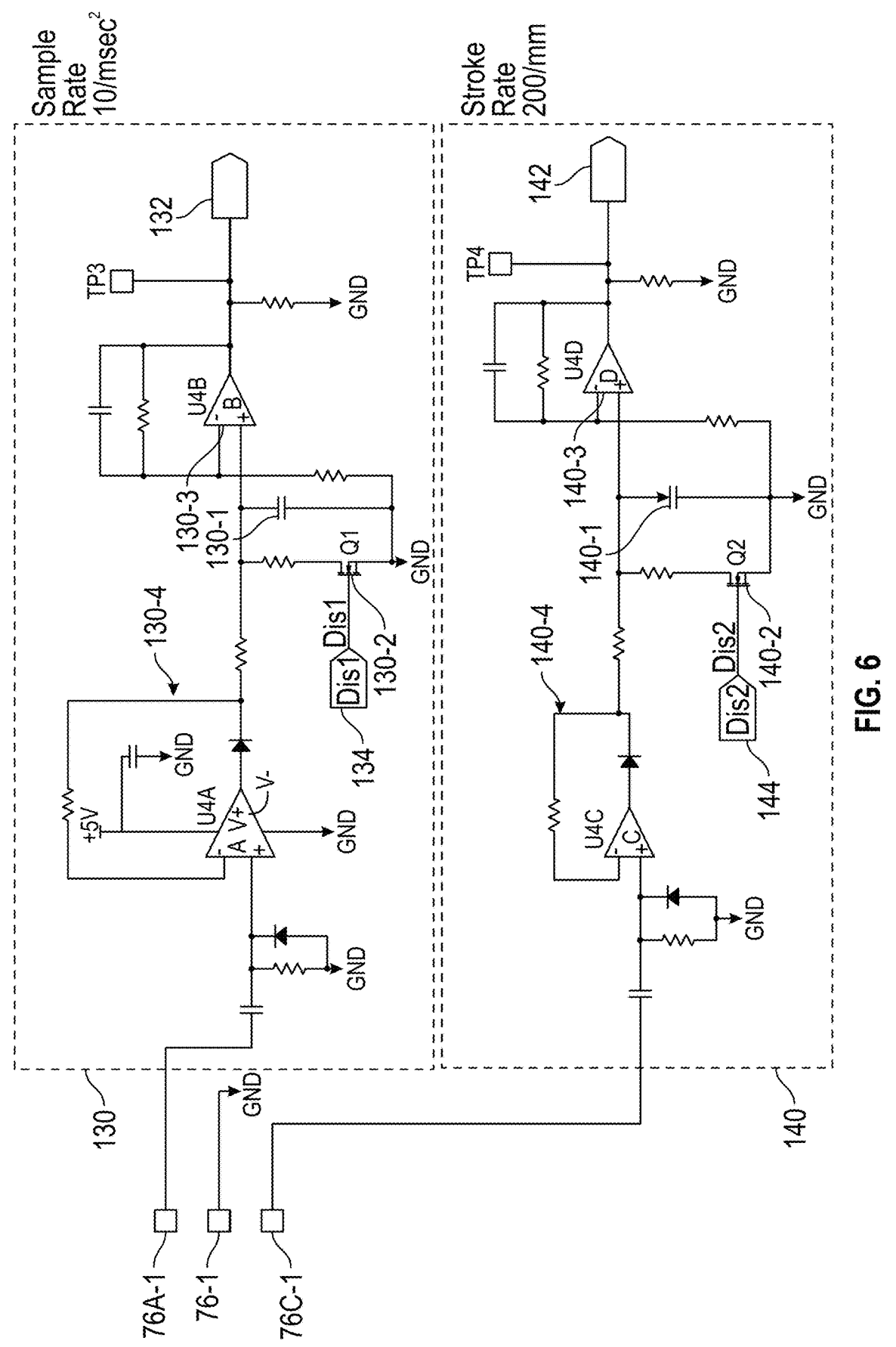
FIG. 6 illustrates a circuit schematic of an exemplary embodiment of the peak sensors of the electronics module of FIG. 5.

FIG. 6 illustrates a circuit schematic of an exemplary embodiment of peak sensors 130 and 140. The circuits 130 and 140 are similar. Each sensor in this embodiment includes a half-wave rectifier, generally indicated as 130-4 and 140-4, to rectify the AC voltage induced in each coil by the drive coil and the respective position of the ferrite rod structure, and produces a DC voltage. A capacitor in each circuit, 130-1 and 140-1, is charged by the respective DC voltage. A signal representative of the voltage on the capacitor 130-1 held on the exemplary op amp 130-3 is read by the microcontroller at terminal 130-2 each sample interval, and the value converted by an A/D converter function of the microcontroller to a digital value. The capacitor 130-1 is discharged by transistor 130-2 after each sample is read, by the microcontroller control signal at terminal 134. Similarly, a signal representative of the voltage on the capacitor 140-1 is held by op amp 140-3 and read by the microcontroller at terminal 140-2 and the value converted to a digital value. The capacitor 140-1 is discharged by transistor 140-2 after each sample is read, by a microcontroller control signal at terminal 144.

With the sensor body 70 oriented vertically, the first coil 76A is the bottom or lower coil and the third coil 76C is the top or upper coil. The ferrous material (rod 82) in the float structure 80 sits at the bottom of the flow sensor channel 72 between strokes of the pump, i.e. with no flow through the channel. This makes the lower coil 76A produce the maximum induced voltage and the upper coil 76C to product the lowest induced voltage at no flow. When a fluid stroke occurs, the float structure moves up within the channel 72, the voltage induced in the bottom coil 76A decreases and the voltage induced in the upper coil 76C increases.

In an exemplary embodiment, the microcontroller 110 is programmed to take representations of the upper coil voltage, subtract the bottom coil voltage from the upper coil voltage and add the non-moving float position voltage (bottom coil voltage at no flow through the channel). This gives a linear output to the maximum stroke length in voltage from 0 to twice the maximum voltage. The distance the float structure travels over a pump stroke time would represent the velocity of the float structure. If this velocity value is plotted, or distance the float moved against a measured flow rate per stroke, a repeatable linear correlation is obtained.

BV=Bottom Coil Voltage
TV=Top Coil Voltage
ZV=Value of BC Voltage at rest
Formula for calculating float position in voltage.

$$TotalVoltage=(TV-BV)+ZV$$

The formula for TotalVoltage may also be characterized by representing the voltage with counts from the output of the ADC.

BC=Bottom Coil count
TC=Top Coil count
ZV=Value of BC count at rest $$TotalCount=(TC-BC)+ZV$$

Assume the ADC output has a range between 0 and 3000 counts. Calibration is done at say total counts (TotalCount) of 500 and 1000 and 2000. Calibration is done by logging the measured flow rate at these A/D count numbers. This involves measuring the actual flow at the several A/D count values, and storing the measured flows in microcontroller memory. Then a count per ml can be determined. So if the TotalCount value is 2000, this corresponds to 2000*(ml per count). This is linear and as long as the pump stroke length was calibrated correctly, the results are repeatable between the pumps without calibration.

Pumps are calibrated by adjusting stroke length, to allow for a flow rate with a specified pressure. For example, for a pump that needs to work at say 250 psi, the stroke length will need to be set so the pump can handle 250 psi. If the length is too long the stroke will not complete. So given the force the pump exert on the diaphragm, the pump's flow rating will be at maximum pressure. Below maximum pressure, the flow rate of the pump will vary depending on pressure. For this example, any pressure under 250 psi will actually increase the flow of a dosing pump. So at 250psi the flow is say 31 ml per minute, but at 100 psi the same pump with the same stroke length is now 60 ml per min.

During a pulse the fluid moves the float structure upwardly in the channel 72. The peak capture circuits 130, 140 grab the float position at its peak before it drops between strokes. As an example, assume that the float structure at rest will induce a voltage with a value of 2300 counts on the bottom coil, and zero voltage on the top coil. Therefore, at rest, TC value=0, BV value=2300 and ZV=2300. So the Totalcount value is (0−2300)+2300=0 at rest. If during a pulse the peak values TC=1500, and the BV value=600, with ZV=2300, then the Totalcount value is (1500−600)+2300 and the Total count value is 3200. If calibration determined that the pump delivered 0.122 micro liters (ul) per count then 0.122 ul×3200=0.39 ml per stroke. If the pump is stroking at 200 strokes per minute, then 0.39 ml×200 would provide 78 ml per minute or 4.68 liters per hour, or 29.52 gal per day.

The actual distance the float structure moves during a stroke is directly proportional to the velocity of the fluid moving within the channel. So the float movement would be related to the fluid volume/(pi×radius squared) per stroke in cubic inches, which can be convert to liters. Consider the example in which the fluid volume delivered per stroke is 0.39 ml, which is equivalent to 0.024 cubic inches. In the exemplary embodiment, the diameter of the channel 72 is 0.344 inch, i.e. with a radius of 0.172 inch. The distance of the float movement=0.024 cubic inches/(3.14×0.172 squared) which equals 0.25 inches. The velocity of the fluid is equivalent to the distance traveled over a set solenoid on time, say 68 ms, Thus the velocity of the fluid is directly related to volume pumped per stroke.

An exemplary embodiment of the flow sensor has been tested to accurately measure fluid flow down to 13 milliliters (0.013 liters) per minute @200 strokes, or 65 microliters (0.0000665) per stroke, and up to a flow rate of 118 ml per minute.

The float structure employs longitudinal channels along the edges to affect the height of float movement during dosing strokes. It has been found that lower flow rates (13 ml to 40 ml per minute) will have better resolution with smaller channels than the (40 ml to 118 ml per minute) higher flow rate.

Figure 7:
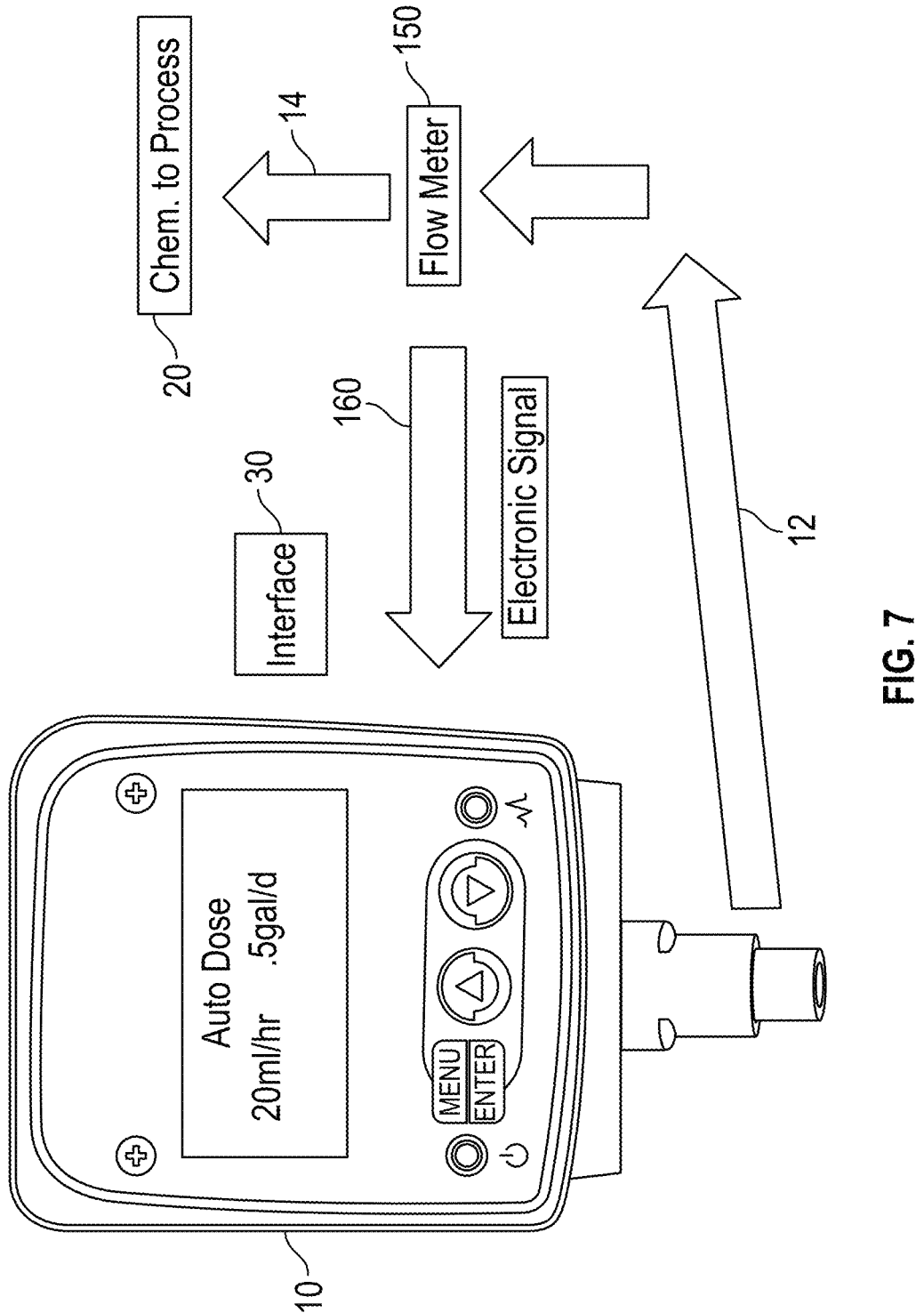
FIG. 7 is a schematic depiction of an exemplary application for the flow meter of FIG. 5.

FIG. 7 is a schematic depiction of an exemplary application for the flow meter 150. In this application, a dosing pump 10 is set up to pump a dose of a chemical to a process 20 through fluid lines 12 and 14. The process could be, for example, in a industrial cooling tower circulation loop to inject corrosion inhibitors, biocides, acids, and or caustic via a dosing pump. The flow meter 150 is connected at the output of the pump 10 between lines 12 and 14 to measure the fluid flow from the pump. The flow meter output 160 may be connected to the pump 10 to provide a closed loop dosing system by adjusting the pump to meter the dose set by the user. The output 160 could be sent additionally or alternatively to the user's hardware interface 30.

Although the foregoing has been a description and illustration of specific embodiments of the subject matter, various modifications and changes thereto can be made by persons skilled in the art without departing from the scope and spirit of the invention.

The invention claimed is:

1. A flow meter for a pulsed fluid stream which performs a succession of pulses, comprising:
   a flow sensor body defining an internal flow channel having an inlet and an outlet, the flow channel configured to allow flow of the fluid stream in a direction from said inlet to said outlet;
   a float structure movable in said flow channel in said direction by the pulsed stream and being biased to perform a movement counter to said direction between successive pulses of the fluid stream, the float structure comprising a float body and a ferromagnetic body;
   first, second and third coils surrounding first, second and third portions of the flow sensor body;
      the second coil configured as a drive coil for connection to an AC signal generator and situated between the first and third coils along the float body;
      each of said first and third coils configured to generate induced voltage signals in response to the position of said float structure in said flow channel; and
   an electronics module connected to the first, second and third coils, the electronics module including:
      the AC signal generator connected to the second coil to drive the second coil with AC signals;
      the module configured to measure the position of the float structure in said flow channel, the module responsive to the induced voltage signals from each of the first and third coils and configured to determine the first peak voltage of the first coil with the float structure at rest between pulses of the fluid stream and the third peak voltage of the third coil during each pulse of the fluid stream;
      the module configured to generate a flow meter signal indictive of a fluid flow quantity passed through the channel.

2. The flow meter of claim 1, wherein the electronics module includes an electronic controller responsive to signals indicative of the first peak voltage and the third peak voltage.

3. The flow meter of claim 2, wherein the electronic controller is configured to correlate the signals indicative of the first peak voltage and the third peak voltage to a fluid quantity passed through the channel during a pulse.

4. The flow meter of claim 3, wherein the electronic controller comprises a microcontroller.

5. The flow meter of claim 1 wherein the sensor body is configured for vertical mounting so that gravity biases the float structure to a rest position between pulses.

6. The flow meter of claim 1 wherein first and second check valves are positioned in fluid communication with the respective inlet and outlet of the channel.

7. A fluid dispensing system comprising:

a dosing pump configured to provide the pulsed fluid stream of claim 1; and the flow meter of claim 1.

8. A flow meter for a pulsed fluid stream which performs a succession of pulses, comprising:

a flow sensor body defining an internal flow channel having an inlet and an outlet, the flow channel configured to allow flow of the fluid stream in a direction from said inlet to said outlet:

a float structure movable in said flow channel in said direction by the pulsed stream and being biased to perform a movement counter to said direction between successive pulses of the fluid stream, the float structure comprising a float body and a ferromagnetic body:

first, second and third coils surrounding first, second and third portions of the flow sensor body;

the second coil configured as a drive coil for connection to an AC signal generator and situated between the first and third coils along the float body;

each of said first and third coils configured to generate induced voltage signals in response to the position of said float structure in said flow channel; and an electronics module connected to the first, second and third coils, the electronics module including:

the AC signal generator connected to the second coil to drive the second coil with AC signals;

the module configured to measure the position of the float structure in said flow channel, the module responsive to the induced voltage signals from each of the first and third coils and configured to determine the first peak voltage of the first coil with the float structure at rest between pulses of the fluid stream and the third peak voltage of the third coil during each pulse of the fluid stream;

the module configured to generate a flow meter signal indictive of a fluid flow quantity passed through the channel; and wherein the float structure comprises a plurality of elongated channels extending longitudinally along the periphery of the float body.

9. The flow meter of claim 8, wherein the float body comprises a sheath fabricated of a plastic material, and the ferromagnetic body is a ferrite rod disposed within the sheath.

10. A method for measuring fluid flow of a pulsed fluid stream which performs a succession of pulses, comprising:

providing a sensor body defining a flow channel for the flow of the fluid stream and having an inlet and an outlet;

positioning a movable float structure in the flow channel and being biased to perform a movement counter to the direction of fluid flow between successive pulses of the fluid stream, the float structure comprising a ferromagnetic body;

providing first, second and third coils surrounding first, second and third portions of the sensor body the second coil disposed between the first and third coils along the sensor body;

driving the second coil with an AC signal to generate induced voltage signals in the first and third coils in response to the position of said float structure in said channel; and analyzing the induced voltage signals in the first and third coils to determine the peak voltage of the first coil with the float structure at rest between pulses and the peak voltage of the third coil during each pulse and generating a flow meter signal indictive of a fluid flow passed through the channel.

11. The method of claim 10, further comprising:

calculating a stroke rate by the declining detections from one pulse to another.

12. The method of claim 10, wherein the float structure comprises a sheath having a plurality of elongated channels extending longitudinally along the periphery of the float structure, the method further comprising selecting the size of the channels in dependence on fluid characteristics and fluid flow rate.

13. The method of claim 10, wherein said analyzing includes correlating said peak voltage of the first coil and said peak voltage of the third coil to a fluid quantity passed through the channel during a pulse.

14. The method of claim 10, further comprising:

in a calibration step, measuring a fluid quantity passed through the channel for a predetermined set of values of said peak voltages of the first and third coils; and storing data representative of a calibrated fluid quantity in a digital memory.

15. The method of claim 10, wherein said step of providing a sensor body defining a flow channel includes positioning the sensor body so that the flow channel is oriented vertically so that gravity biases the float structure to a rest position between pulses.

16. The method of claim 10, further comprising:

fluidically coupling the sensor body to a dosing pump to provide the pulsed fluid stream.

* * * * *